(12) United States Patent
Sullivan et al.

(10) Patent No.: US 9,199,132 B2
(45) Date of Patent: Dec. 1, 2015

(54) COMPOSITIONS INCORPORATING ETHYLENE ACID (E/X) IONOMERS AND NON-IONOMERIC SOFTENING POLYMERS FOR GOLF BALL CONSTRUCTIONS AND METHODS RELATING THERETO

(71) Applicant: Acushnet Company, Fairhaven, MA (US)

(72) Inventors: Michael J. Sullivan, Old Lyme, CT (US); David A. Bulpett, Boston, MA (US); Robert Blink, Newport, RI (US); Mark L. Binette, Mattapoisett, MA (US); Brian Comeau, Berkley, MA (US)

(73) Assignee: Acushnet Company, Fairhaven, MA (US)

( * ) Notice: Subject to any disclaimer, the term of this patent is extended or adjusted under 35 U.S.C. 154(b) by 194 days.

(21) Appl. No.: 14/070,613

(22) Filed: Nov. 4, 2013

(65) Prior Publication Data
US 2015/0126306 A1 May 7, 2015

(51) Int. Cl.
*A63B 37/04* (2006.01)
*A63B 37/06* (2006.01)
*A63B 37/12* (2006.01)
*A63B 37/00* (2006.01)
*A63B 45/00* (2006.01)

(52) U.S. Cl.
CPC ........... *A63B 37/0077* (2013.01); *A63B 37/003* (2013.01); *A63B 37/006* (2013.01); *A63B 37/0024* (2013.01); *A63B 37/0036* (2013.01); *A63B 37/0059* (2013.01); *A63B 37/0061* (2013.01); *A63B 37/0074* (2013.01); *A63B 37/0078* (2013.01); *A63B 37/0087* (2013.01); *A63B 45/00* (2013.01)

(58) Field of Classification Search
USPC ................................ 473/351–378
See application file for complete search history.

(56) References Cited

U.S. PATENT DOCUMENTS

| | | | | |
|---|---|---|---|---|
| 4,690,981 | A | * | 9/1987 | Statz ......................... 525/329.6 |
| 4,801,649 | A | * | 1/1989 | Statz ............................. 525/183 |
| 5,567,772 | A | * | 10/1996 | Hagman et al. ............... 525/221 |
| 5,580,927 | A | * | 12/1996 | Chou et al. .................... 525/201 |
| 6,562,906 | B2 | | 5/2003 | Chen |
| 6,596,815 | B1 | | 7/2003 | Feinberg |
| 6,756,443 | B2 | | 6/2004 | Feinberg |
| 6,762,246 | B2 | | 7/2004 | Chen |
| 7,037,967 | B2 | | 5/2006 | Chen |
| 7,273,903 | B2 | | 9/2007 | Chen |
| 7,365,128 | B2 | | 4/2008 | Sullivan |
| 7,488,778 | B2 | | 2/2009 | Chen |
| 7,642,319 | B2 | | 1/2010 | Sullivan |
| 7,744,494 | B2 | * | 6/2010 | Jordan et al. .................. 473/378 |
| 8,088,026 | B2 | | 1/2012 | Chen et al. |
| 8,163,823 | B2 | | 4/2012 | Sullivan |
| 8,193,283 | B2 | | 6/2012 | Chen |
| 8,337,331 | B2 | * | 12/2012 | Bulpett et al. ................ 473/376 |
| 8,399,566 | B2 | * | 3/2013 | Kim et al. ..................... 525/201 |

* cited by examiner

*Primary Examiner* — Alvin Hunter
(74) *Attorney, Agent, or Firm* — Margaret C. Baker

(57) ABSTRACT

A golf ball comprising a core and a cover disposed about the core; wherein at least one of the core and the cover comprises a tri-blend composition of the non-E/X/Y type (TBC) formed from a blend of an ethylene acid (E/X) ionomer, a non-ionomeric softening copolymer (NISC) and a low viscosity component (LVC). A portion of the TBC comprising the ethylene acid (E/X) ionomer and the NISC has a Melt Flow Index $MF_1$ and a $CoR_1$ and the TBC has a Melt Flow Index $MF_2$ and a $CoR_2$ such that $MF_2 > MF_1$ and $CoR_1$ and $CoR_2$ differ by less than about 0.1. In one embodiment, the TBC has a composition property relationship $\Delta CoR/\Delta MFI \leq \sim 10$, wherein $\Delta CoR$ is the amount by which $CoR_1$ and $CoR_2$ differ, and $\Delta MFI = (MFI_2 - MFI_1)$. In one embodiment, the TBC comprises a phase-separated blend. The invention is also directed to a method of making the golf ball.

40 Claims, No Drawings

COMPOSITIONS INCORPORATING ETHYLENE ACID (E/X) IONOMERS AND NON-IONOMERIC SOFTENING POLYMERS FOR GOLF BALL CONSTRUCTIONS AND METHODS RELATING THERETO

FIELD OF THE INVENTION

This invention relates generally to compositions incorporating ethylene acid (E/X) ionomers and non-ionomeric softening polymers suitable for golf ball constructions as well as to methods for such making golf balls and to the resulting golf balls.

BACKGROUND OF THE INVENTION

Golf balls, whether of solid or wound construction, generally include a core and at least a cover and/or outer coating. The core may be solid or liquid-filled, and may comprise one piece or have a center with one or more outer core layers formed about the center. Covers may also be formed of one or more layers. Multi-layer cores and covers are sometimes known as "dual core" and "dual cover" golf balls, respectively.

The playing characteristics of golf balls, such as spin, feel, CoR and compression can be tailored by varying the properties of the golf ball materials and/or adding additional golf ball layers such as at least one intermediate layer disposed between the cover and the core. Intermediate layers can be of solid construction or may be formed of a tensioned elastomeric winding, which are referred to as wound balls. The difference in play characteristics resulting from these different types of constructions can be quite significant.

Cores are generally made using techniques such as compression or injection molding. Typically, the center is formed by compression molding a slug of uncured core material into a spherical structure. The outer core layers may be formed, for example, by molding compositions over the center by compression or injection molding techniques. In turn, the intermediate and/or cover layers are applied.

A cover layer(s) may be formed over the outermost of the core or intermediate layer (collectively referred to herein as "ball subassembly") using suitable techniques including, for example, compression-molding, flip-molding, injection-molding, retractable pin injection-molding, reaction injection-molding (RIM), liquid injection-molding, casting, spraying, powder-coating, vacuum-forming, flow-coating, dipping, spin-coating, and the like. In a compression molding process, hemispherical shells are generally placed about the subassembly in a compression mold and fused together under sufficient heat and pressure. In contrast, with an injection molding process, cover material is injected about and directly onto the subassembly using retractable pins, for example.

When a cover layer is formed by a casting process, liquid cover material is poured into lower and upper mold cavities, into which a subassembly is lowered at a controlled speed. The subassembly is held in place via partial vacuum to the point of sufficient gelling, and then the upper mold cavity is mated with the lower mold cavity under sufficient pressure and heat followed by cooling the unit until it can be handled without deformation.

Golf ball core and cover layers are typically constructed with polymer compositions such as polybutadiene rubber, polyurethanes, polyamides, ionomers, and blends thereof. Ionomers, particularly ethylene-based ionomers, are a desirable group of polymers for golf ball layers because of their toughness, durability, and wide range of hardness values. One example is the ethylene acid ionomer SURLYN®, available from E. I. Du Pont de Nemours & Co., Inc., Wilmington, Del. (DuPont), However, ethylene acid ionomeric copolymers, while being durable, produce golf balls lacking the "feel" provided by softer materials. Non-ionomeric softening compositions such as Fusabond® 525D (a tradename for a maleic anhydride modified metallocene catalyzed ethylene-butene copolymers, produced by E. I. DuPont de Nemours & Co. of Wilmington, Del.), are capable of providing the desired feel without sacrificing durability, but typically "kill" or destroy golf ball properties such as hardness and CoR when incorporated at high levels.

And while blends of non-ionomeric softening compositions and ethylene acid ionomers might overcome the difficulties presented by each when used individually, such blends have heretofore encountered processing difficulties because the blends have undesirably low Melt Flow Rates or Indexes ("MFIs")—for example when manufacturing golf balls/components via injection or compression molding.

Accordingly, there is a need for golf balls and methods of making golf balls incorporating blends comprising ethylene acid ionomeric copolymers and non-ionomeric softening compositions which have higher MFIs and therefore are more easily processable than current lower MFI ethylene acid ionomeric copolymers/non-ionomeric softening composition blends. The present invention addresses and solves these needs.

SUMMARY OF THE INVENTION

The invention is therefore directed to a golf ball comprising a core and a cover disposed about the core; wherein at least one of the core and the cover comprises a tri-blend composition of the non-E/X/Y type (TBC) formed from a blend of an ethylene acid (E/X) ionomer, a non-ionomeric softening copolymer (NISC) and a low viscosity component (LVC). A portion of the TBC comprising the ethylene acid (E/X) ionomer and the NISC has a Melt Flow Index $MF_1$ and a $CoR_1$ and the TBC has a Melt Flow Index $MF_2$ and a $CoR_2$ such that $MF_2 > MF_1$ and $CoR_1$ and $CoR_2$ differ by less than about 0.1.

The E/X ionomer may be formed from ethylene and an α,β-ethylenically unsaturated carboxylic acid. In one embodiment, the α,β-ethylenically unsaturated carboxylic acid comprises at least one of acrylic acid and methacrylic acid.

Herein "NISC" shall refer to an hydrocarbon elastomer. In another embodiment, the NISC is a grafted hydrocarbon elastomer. In a different embodiment, the NISC comprises a polar group modified hydrocarbon elastomer. For example, the NISC may comprise at least one of ethylene butene, ethylene hexane, ethylene octane, EPDM and SEBS copolymers.

Non-limiting examples of the LVC include polyethylene homopolymers, a high-density oxidized polyethylene homopolymers, a polypropylene homopolymers, ethylene-acrylic acid copolymers, oxidized ethylene-vinyl acetate copolymers, polyethylene copolymers, ethylene maleic anhydride copolymers, and propylene maleic anhydride copolymers. Additional non-limiting examples appear herein below.

In one embodiment, the TBC has a portion comprising the E/X ionomer and NISC, wherein the E/X ionomer is present in the portion in an amount of from about 30% to about 85%. In another embodiment, TBC has a portion comprising the E/X ionomer and NISC, wherein the E/X ionomer is present in the portion in an amount of from about 30% to about 75%. In yet another embodiment, TBC has a portion comprising the E/X ionomer and NISC, wherein the E/X ionomer is present in the portion in an amount of from about 30% to about 60%.

In one embodiment, the TBC has a portion comprising the E/X ionomer and NISC, wherein the NISC is present in the portion in an amount of from about 15% to about 70% of the portion. In another embodiment, the TBC has a portion comprising the E/X ionomer and NISC, wherein the NISC is present in the portion in an amount of from about 25% to about 70% of the portion. In yet another embodiment, the TBC has a portion comprising the E/X ionomer and NISC, wherein the NISC is present in the portion in an amount of from about 40% to about 70% of the portion.

In one embodiment, the portion has a Melt Flow Index ("MFI") of less than about 3 g/10 mins. In another embodiment, the portion has an MFI of less than about 2.0 g/10 mins. In yet another embodiment, the portion has an MFI of less than about 1.5 g/10 mins. In still another embodiment, the portion has an MFI of less than about 1.0 g/10 mins.

In one embodiment, $MF_2 > MF_1$ by up to about 0.03 g/10 mins or greater. In another embodiment, $MF_2 > MF_1$ by at least about 0.11 g/10 mins. In yet another embodiment, $MF_2 > MF_1$ by about 0.66 g/10 mins or greater. In still another embodiment, $MF_2 > MF_1$ by about 1.68 g/10 mins or greater.

In one embodiment, the TBC comprises the LVC in an amount of from about 2% to about 40% of the tri-blend. In another embodiment, the TBC comprises the LVC in an amount of from about 5% to about 40% of the tri-blend. In yet another embodiment, the blend comprises the LVC in an amount of from about 10% to about 40% of the tri-blend.

The TBC may have an Atti compression of from about −75 to about 200. However, embodiments are envisioned in which the TBC has higher and lower compression as measurable by methods developed for measuring compression. For example, the TBC may have a "DCM" compression lower than −75 Atti as measured by a Dynamic Compression Machine, discussed more fully below.

In one embodiment, $CoR_1$ and $CoR_2$ differ by less than about 0.09. In another embodiment, $CoR_1$ and $CoR_2$ differ by less than about 0.083. In yet another embodiment, $CoR_1$ and $CoR_2$ differ by less than about 0.075. In still another embodiment, $CoR_1$ and $CoR_2$ differ by less than about 0.05. In a different embodiment, $CoR_1$ and $CoR_2$ differ by less than about 0.033. In an alternative embodiment, $CoR_1$ and $CoR_2$ differ by less than about 0.025. $CoR_1$ and $CoR_2$ may in one embodiment differ by less than about 0.015.

In one embodiment, the TBC has a composition property relationship $\Delta CoR/\Delta MFI \leq \sim 10$, wherein $\Delta CoR$ is the amount by which $CoR_1$ and $CoR_2$ differ, and $\Delta MFI = (MFI_2 - MFI_1)$. In another embodiment, the TBC has a composition property relationship $\Delta CoR/\Delta MFI \leq \sim 7$, wherein $\Delta CoR$ is the amount by which $CoR_1$ and $CoR_2$ differ, and $\Delta MFI = (MFI_2 - MFI_1)$. In yet another embodiment, the TBC has a composition property relationship $\Delta CoR/\Delta MFI \leq \sim 5$, wherein $\Delta CoR$ is the amount by which $CoR_1$ and $CoR_2$ differ, and $\Delta MFI = (MFI_2 - MFI_1)$. In still another embodiment, the TBC has a composition property relationship $\Delta CoR/\Delta MFI \leq \sim 3$, wherein $\Delta CoR$ is the amount by which $CoR_1$ and $CoR_2$ differ, and $\Delta MFI = (MFI_2 - MFI_1)$. In a different embodiment, the TBC has a composition property relationship $\Delta CoR/\Delta MFI \leq \sim 1$, wherein $\Delta CoR$ is the amount by which $CoR_1$ and $CoR_2$ differ, and $\Delta MFI = (MFI_2 - MFI_1)$.

A golf ball of the invention also comprises a core and a cover disposed about the core; wherein at least one of the core and the cover comprises a tri-blend composition of the non-E/X/Y type (TBC) formed from a blend of an ethylene acid ionomer (E/X), a non-ionomeric softening copolymer (NISC) and a low viscosity component (LVC); and wherein the TBC comprises a phase-separated blend.

Herein, the term "phase-separated blend" refers to a polymer blend in which at least one of the components is at least partially immiscible. In one embodiment, the phase-separated blend comprises a continuous phase and a discontinuous phase wherein the average size of the discontinuous phase is less than about 10 microns. In another embodiment, the phase-separated blend comprises a continuous phase and a discontinuous phase comprising wherein the average size of the discontinuous phase is less than about 5 microns. In yet another embodiment, the phase-separated blend comprises a continuous phase and a discontinuous phase wherein the average size of the discontinuous phase is from about 5 microns to about 10 microns. In still another embodiment, the phase-separated blend comprises a continuous phase and a discontinuous phase wherein the average size of the discontinuous phase is from less than about 1 micron to about 7 microns. In a different embodiment, the phase-separated blend comprises a continuous phase and a discontinuous phase wherein the average size of the discontinuous phase is from greater than about 3 microns to about 9 microns.

The invention is also directed to a method of making a golf ball comprising: providing a core and forming a cover about the core; wherein at least one of the core and the cover comprises a tri-blend composition of the non-E/X/Y type (TBC) that is formed by blending an ethylene acid ionomer (E/X), a non-ionomeric softening copolymer (NISC) and a low viscosity component (LVC); and wherein a portion of the TBC comprising the ethylene acid (E/X) ionomer and the NISC has a Melt Flow Index $MF_1$ and a $CoR_1$ and the TBC has a Melt Flow Index $MF_2$ and a $CoR_2$ such that $MF_2 > MF_1$ and $CoR_1$ and $CoR_2$ differ by less than about 0.1.

It is envisioned that the TBC or tri-blend composition may be incorporated in any or all of a core, outer core layer, intermediate layer, inner core layer and outer core layer, or even coatings as desired. The TBC may be a single composition forming the core and/or layer or may be combined with other ingredients in order to further modify the properties of the resulting layer and/or overall golf ball. The improved processability of a TBC over former blends comprising ethylene acid (E/X) ionomer and non-ionomeric softening polymers without substantially changing or negatively impacting compression, hardness and CoR, makes the TBC an attractive alternative for targeting and achieving desired spin profiles and feel.

DETAILED DESCRIPTION OF THE INVENTION

Golf balls of the invention incorporate materials that are easily processable and yet have the compression necessary for providing a player with a desirable golf ball "feel" and yet the hardness necessary for maintaining golf ball durability. In this regard, seven ethylene acid (E/X) ionomeric-based tri-blend compositions (TBCs) were formed as detailed in TABLE I below and injection molded into 1.55" spheres. The MFI, compression, hardness and CoR were then evaluated with respect to each sphere. These results are as follows:

TABLE I

| Material or Property | TBC EXAMPLES | | | | | | |
|---|---|---|---|---|---|---|---|
| | I | II | III | IV | V | VI | VII |
| % Surlyn 8150 | 24.5 | 23.8 | 22.5 | 20.0 | 23.8 | 22.5 | 20.0 |
| % Surlyn 9120 | 24.5 | 23.8 | 22.5 | 20.0 | 23.8 | 22.5 | 20.0 |
| % Fusabond 525D | 49.0 | 47.5 | 45.0 | 40.0 | 47.5 | 45.0 | 40.0 |
| % A-C 5120 | 2.0 | 5.0 | 10.0 | 20.0 | — | — | — |
| % A-Clyn 282 | — | — | — | — | 2.5 | 5.0 | 10.0 |
| % A-Clyn 297 | — | — | — | — | 2.5 | 5.0 | 10.0 |
| Melt Index | 0.11 | 0.19 | 0.74 | 1.76 | 0.13 | 0.4 | 0.6 |
| Atti Compression | 108 | 115 | 116 | 116 | 113 | 118 | 123 |
| Sphere Hardness (Shore D) | 49.0 | 49.3 | 49.4 | 48.5 | 50.5 | 50.2 | 52.4 |
| CoR | 0.714 | 0.707 | 0.694 | 0.674 | 0.719 | 0.721 | 0.718 |

Referring to TABLE I, TBCs I-VII are each tri-blend compositions of the non-E/X/Y type (TBC) formed from a blend of an ethylene acid (E/X) ionomer, a non-ionomeric softening copolymer (NISC) and a low viscosity component (LVC). In this regard, each of tri-blends I-VIII has a portion comprising an ethylene acid (E/X) ionomer and a NISC in a 1:1 ratio, that is a total of 50 parts ethylene acid (E/X) ionomer and 50 parts NISC. The NISC comprises Fusabond 525D. However, the ethylene acid (E/X) ionomer is a mixture of Surlyn® 8150 and Surlyn® 9120, so that the Surlyn®8150, Surlyn® 9120 and Fusabond® 525D are present in the portion in parts per hundred (pph) of 25 parts, 25 parts and 50 parts, respectively.

Each TBC of examples I-IV includes A-C® 5120 as the LVC. The LVC is present in each of TBCs I-IV in amounts of 2%, 5%, 10% and 20% of the entire tri-blend, respectively. Meanwhile, in each of TBCs V-VII, the LVC is a mixture of AClyn® 282 and AClyn 297. And each of AClyn®282 and AClyn®297 is present in the TBC in an amount of 2.5%, 5.0%, and 10% of the entire tri-blend, respectively.

In examples I-IV, the relative amounts of the ethylene acid (E/X) ionomer and NISC in the portion remained constant from example I to example IV as the amount of LVC in each TBC was increased from example I to example IV. Similarly, in examples V-VII, the relative amounts of the ethylene acid (E/X) ionomer and NISC in the portion remained constant from example V to example VII as the amount of LVC in each TBC was increased from example V to example VII.

In contrast, six comparative blends CI-CVI were also formed as follows in TABLE II below:

TABLE II

| Material or Property | Comparative Blends CI-CVI | | | | | |
|---|---|---|---|---|---|---|
| | CI | CII | CIII | CIV | CV | CVI |
| % Surlyn 8150 | 25.0 | 50.0 | 45.0 | 50.0 | 45.0 | 24.5 |
| % Surlyn 9120 | 25.0 | 50.0 | 45.0 | 50.0 | 45.0 | 24.5 |
| % Fusabond 525D | 50.0 | — | — | — | — | 49.0 |
| % A-C 5120 | — | — | 10.0 | — | — | — |
| % A-Clyn 282 | — | — | — | — | 5.0 | 1.0 |
| % A-Clyn 297 | — | — | — | — | 5.0 | 1.0 |
| Melt Index | 0.08 | 3.2 | 6.7 | 3.2 | 4.6 | 0.08 |
| Atti Compression | 109 | 165 | 162 | 165 | 163 | 111 |
| Sphere Hardness (Shore D) | 48.6 | 72.0 | 73.4 | 72.0 | 73.3 | 49.0 |
| CoR | 0.718 | 0.787 | 0.784 | 0.787 | 0.786 | 0.720 |

In TABLE II, comparative blends CI-CV differ from TBCs I-VII of TABLE I in that at least one of the NISC and/or LVC is excluded from each blend. Specifically, while comparative blend CI includes an ethylene acid (E/X) ionomer and a NISC, CI does not comprise an LVC. Meanwhile, comparative blends CII and CIV include an ethylene acid (E/X) ionomer but exclude the NISC and LVC. And CIII and CV include an ethylene acid (E/X) ionomer and the LVC but exclude the NISC.

Notably, comparative example CVI of TABLE II includes an ethylene acid (E/X) ionomer, a NISC, as well as the LVC.

Examples I-IV and V-VII and comparative examples CI-CVI demonstrate that for a constant portion, as the amount of a targeted amount of LVC is increased, the MFI of the TBC favorably also substantially increases. In particular, the TBC I of TABLE I, which includes 2% LVC, has a melt flow index (MFI) of 0.11, which is about 1.375 times greater than the MFI of comparative example CI (0.08), which does not include an LVC. In turn, as the % LVC is increased in examples II-IV to 5%, 10% and 20%, respectively, the corresponding MFIs also increase by 2.375 times, 9.25 times and 22 times, respectively over the MFI of comparative example CI.

In addition, a comparison of examples V-VII with comparative examples CI and CVI demonstrates that the % LVC in a TBC must be targeted to achieve an MFI increase in the TBC over the portion of the TBC (comparative example CI). In particular, CVI shows that a tri-blend including 2% of the chosen LVC was not enough to improve the MFI of CVI over the MFI of comparative blend CI.

In contrast, the TBC of example V of TABLE I incorporating 5% of the same LVC as used in comparative example CVI did increase the MFI to 0.11—an increase in melt flow of about 1.625 times over the MFI of comparative example CVI. Then, in examples VI-VII, as % LVC is increased, their respective MFIs increased 5 times and 7.5 times, respectively, over the MFI of comparative example CVI.

And as is evident from TABLE I, MFI is improved without substantially changing CoR, hardness and compression. For example, ΔCoR as between the materials of examples I and IV of TABLE I is 0.04, ΔSh. D as between the materials of examples I and III is 5 Shore D, and ΔAtti as between the materials of examples I and III (or IV) is 8. Similarly, ΔCoR as between the materials of examples VI and VII of TABLE I is 0.003, ΔShore D as between the materials of examples VI and VII is 2.2 Shore D, and ΔAtti as between the materials of examples V and VII (or IV) is 10.

Thus, the formulations of examples I-VII of TABLE I are more easily processable without a substantial resulting change in the CoR, hardness and compression- and sufficient for providing the desirable "feel" yet maintaining golf ball durability. In contrast, the materials in comparative examples CI and CVI have poor processability due to low MFI, and comparative examples CII-CV, while having good MFIs, lack the compression and hardness that provide optimum "feel" and durability.

The LVC may comprise Polyethylene Homopolymers. Non-limiting examples include, for example, A-C®820A, A-C® 810A, A-C® 9, 9A, 9F, A-C®8, 8A, A-C®3A, A-C®725, A-C®735, A-C®715, A-C®15, A-C®7, 7A, A-C®6, 6A, A-C®16, 16A, A-C®617, 617A, A-C®1702, A-C®673P, A-C® 680, A-C®655, A-C®629, 629A, A-C®656, and A-C®6702.

The LVC may also comprise High-Density Oxidized Polyethylene Homopolymers. Non-limiting examples include, for example, A-C® 307, 307A, A-C® 316, 316A, A-C® 325, A-C® 392, A-C® 330, and A-C®395, 395A. The LVC may further comprise Polypropylene Homopolymers. Non-limiting examples include, for example, A-C® 1754, A-C® 1660, and A-C® 1089. In another embodiment, the LVC may also comprise Ethylene-Acrylic Acid Copolymers such as A-C® 540, 540A, A-C® 580, A-C® 5120, and/or A-C®5180, for example. Alternatively, the LVC may comprise Polyethylene Homopolymers. Non-limiting examples include A-C®405T, A-C®405M, A-C®405S, A-C®400, A-C®415, and A-C®430. In a different embodiment, the LVC may comprise Oxidized Ethylene-Vinyl Acetate Copolymers such as A-C®645 P, for example.

In yet another embodiment, the LVC may comprise AClyn® Ionomers such as AClyn®201, 201A, AClyn®295, 295A, AClyn®246, 246A, and AClyn®285, 285A. In still another embodiment, the LVC may comprise Ethylene Acrylic Acid Sodium Ionomers such as AClyn®282, and/or Ethylene Acrylic Acid Zinc Ionomers such as AClyn®297. In one embodiment, the LVC includes Ethylene Maleic Anhydride Copolymers such as A-C® 575A, 575P and/or A-C®573A, 573P. The LVC may in other embodiments comprise, for example Propylene Maleic Anhydride Copolymers such as A-C®597A, 597P, A-C®907P, A-C®596A, 596P, A-C®950P, A-C®1325P, and A-C®1325P.

In still another embodiment, the LVC may comprise PRIMACOR® and/or NUCREL® acid copolymers such as NUCREL® 2940, 960, 2806, 599 and/or PRIMACOR® 5980, 3002, 3004, 3150, 3440, 3460. In a different embodiment, the LVC may comprise polyacrylic acid, low molecular weight metallocene copolymers, ethylene vinyl acetate (EVA), ethylene ethyl acrylate (EEA), ethylene butyl acrylate (EBA), ethylene methyl acrylate (EMA).

In an alternative embodiment, the LVC may comprise bisstearamides, waxes, fatty acids, fatty amides, polyethylene glycol for example.

The MFI or melt flow rate characterizes the resistance to flow of a molten plastic material and was determined in accordance with ASTM Standard D1238-04C using a Tinius-Olsen Extrusion Plastometer. The quantity of melt flow is measured by placing the sample in a heated barrel where it is held for a certain time then forced through a die using a weighted piston. The ASTM standard specifies the barrel and die dimensions and suggests a number of temperature and weight conditions typically chosen to give results between 0.15 and 50 g/10 min. Melt flow results are reported as grams of material extruded over a 10-minute time interval at a specified temperature (190° C.) and load (2.16-kg).

Several different methods can be used to measure compression, including Atti compression, Riehle compression, load/deflection measurements at a variety of fixed loads and offsets, and effective modulus. See, e.g., *Compression by Any Other Name, Science and Golf IV, Proceedings of the World Scientific Congress of Golf* (Eric Thain ed., Routledge, 2002) ("J. Dalton"). The term compression, as used herein, refers to Atti compression and is measured using an Atti compression test device. Atti compression units can be converted to Riehle (cores), Riehle (balls), 100 kg deflection, 130-10 kg deflection or effective modulus using the formulas set forth in J. Dalton.

Compression values are dependent on the diameter of the component being measured. As used herein, the terms "Atti compression" or "compression" are defined as the deflection of an object or material relative to the deflection of a calibrated spring, as measured with an Atti Compression Gauge, that is commercially available from Atti Engineering Corp. of Union City, N.J. In the present invention, a solid 1.55' sphere of inventive material may have a DCM compression anywhere within or below the Atti range of from −75 to about 200, depending on the desired properties of the resulting golf ball.

However, lower compressions are envisioned as may be measured by one of ordinary skill in the art. For example, DCM is often used to capture compressions that fall outside the Atti compression scale range of −75 to 200, since the DCM scale compression range is −246 to 200. The Dynamic Compression Machine ("DCM") is an apparatus that applies a load to a core or ball and measures the number of inches the core or ball is deflected at measured loads. A crude load/deflection curve is generated that is fit to the Atti compression scale that results in a number being generated representing an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test.

In the present invention, a solid sphere of inventive material may have a DCM compression of from about −200 or lower to about 150 or greater. In other embodiments, a solid sphere of inventive material may have a DCM compression of from about −200 to about 150. According to one aspect of the present invention, the golf ball is formulated to have a compression of between about 40 and about 120.

The distance that a golf ball would travel upon impact is a function of the coefficient of restitution (CoR) and the aerodynamic characteristics of the ball. For golf balls, CoR has been approximated as a ratio of the velocity of the golf ball after impact to the velocity of the golf ball prior to impact. The CoR varies from 0 to 1.0. A CoR value of 1.0 is equivalent to a perfectly elastic collision, that is, all the energy is transferred in the collision. A CoR value of 0.0 is equivalent to a perfectly inelastic collision—that is, all of the energy is lost in the collision.

CoR, as used herein, is determined by firing a golf ball or golf ball subassembly (e.g., a golf ball core) from an air cannon at two given velocities and calculating the CoR at a velocity of 125 ft/s. Ball velocity is calculated as a ball approaches ballistic light screens which are located between the air cannon and a steel plate at a fixed distance. As the ball travels toward the steel plate, each light screen is activated, and the time at each light screen is measured. This provides an incoming transit time period inversely proportional to the ball's incoming velocity. The ball impacts the steel plate and rebounds through the light screens, which again measure the time period required to transit between the light screens. This provides an outgoing transit time period inversely proportional to the ball's outgoing velocity. CoR is then calculated as the ratio of the outgoing transit time period to the incoming transit time period, $CoR=V_{out}/V_{in}=T_{in}/T_{out}$. Preferably, a golf ball according to the present invention has a CoR of at least about 0.770, more preferably, at least about 0.790.

For purposes of the present disclosure, material hardness is measured according to ASTM D2240 and involves measuring the hardness of a flat "slab" or "button" formed of the material. It should be understood that there is a fundamental difference between "material hardness" and "hardness as measured directly on a golf ball." Hardness as measured directly on a golf ball (or other spherical surface) typically results in a different hardness value from material hardness. This difference in hardness values is due to several factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other. Unless stated otherwise, the hardness values given herein are material hardness values measured according to ASTM D2240, with all values reported following 14 days of aging at 50% relative humidity and 23° C.A calibrated, digital durometer, capable of reading to 0.1 hardness units is used for all hardness measurements and is set to record hardness reading at the maximum reading. The digital durometer must be attached to, and its foot made parallel to, the base of an automatic stand, such that the weight on the durometer and attack rate conform to ASTM D-2240.

Phase separation may be evaluated using, for example, Scanning Electron Microscopy (SEM), and/or Differential Scanning Calorimetry (DSC).

In a golf ball of the invention, the core may comprise a composition including at least one thermoset base rubber, such as a polybutadiene rubber, cured with at least one peroxide and at least one reactive co-agent, which can be a metal salt of an unsaturated carboxylic acid, such as acrylic acid or methacrylic acid, a non-metallic coagent, or mixtures thereof. A suitable antioxidant may be included in the composition. An optional soft and fast agent (and sometimes a cis-to-trans catalyst), such as an organosulfur or metal-containing organosulfur compound, can also be included in the core formulation.

Other ingredients that are known to those skilled in the art may be used, and are understood to include, but not be limited to, density-adjusting fillers, process aides, plasticizers, blowing or foaming agents, sulfur accelerators, and/or non-peroxide radical sources.

The base thermoset rubber, which can be blended with other rubbers and polymers, may include a natural or synthetic rubber. One base rubber is 1,4-polybutadiene having a cis structure of at least 40%, or greater than 80%, or greater than 90%. Examples of desirable polybutadiene rubbers include BUNA®: CB 21, CB 22, CB 23, CB 24, CB 25, CB 29 MES, CB Nd 40, CB Nd 40 H, CB Nd 60, CB 55 NF, CB 60, CB 45 B, CB 55 B, CB 55 H, CB 55 L, CB 70 B, CB 1220, CB 1221, CB 1203, and CB 45, commercially available from LANXESS Corporation; UBEPOL® 360L and UBEPOL® 150L and UBEPOL-BR rubbers, commercially available from UBE Industries, Ltd. of Tokyo, Japan; KINEX® 7245, KINEX® 7265, and BUDENE® 1207 and 1208, commercially available from Goodyear of Akron, Ohio; SE BR-1220; Europrene® NEOCIS® BR 40 and BR 60, commercially available from Polimeri Europa; and BR 01, BR 730, BR 735, BR 11, and BR 51, commercially available from Japan Synthetic Rubber Co., Ltd; PETROFLEX® BRNd-40; Ubepol® sold by Ube Industries Inc, Japan, BST sold by BST Elastomers, Thailand; IPCL sold by Indian Petrochemicals Ltd, India; and KARBOCHEM® ND40, ND45, Nitsu and ND60, commercially available from Karbochem or Karbochem Ltd of South Africa; Petroflex of Brazil; LG of Korea; and Kuhmo Petrochemical of Korea.

The base rubber may also comprise high or medium Mooney viscosity rubber, or blends thereof. A "Mooney" unit is a unit used to measure the plasticity of raw or unvulcanized rubber. The plasticity in a "Mooney" unit is equal to the torque, measured on an arbitrary scale, on a disk in a vessel that contains rubber at a temperature of 100° C. and rotates at two revolutions per minute. The measurement of Mooney viscosity is defined according to ASTM D-1646.

The Mooney viscosity range is preferably greater than about 30, or in the range from about 40 to about 80, or in the range from about 40 to about 60. Polybutadiene rubber with higher Mooney viscosity may also be used, so long as the viscosity of the polybutadiene does not reach a level where the high viscosity polybutadiene clogs or otherwise adversely interferes with the manufacturing machinery. It is contemplated that polybutadiene with viscosity less than 65 Mooney can be used with the present invention.

If desired, the polybutadiene can also be mixed with other elastomers known in the art such as natural rubber, polyisoprene rubber and/or styrene-butadiene rubber in order to modify the properties of the core. Other suitable base rubbers include thermosetting materials such as, ethylene propylene diene monomer rubber, ethylene propylene rubber, butyl rubber, halobutyl rubber, hydrogenated nitrile butadiene rubber, nitrile rubber, and silicone rubber. When a mixture of elastomers is used, the amounts of other constituents in the core composition are typically based on 100 parts by weight of the total elastomer mixture.

Thermoplastic elastomers (TPE) may also be used to modify the properties of the core layers, or the uncured core layer stock by blending with the base thermoset rubber. These TPEs include natural or synthetic balata, or high trans-polyisoprene, high trans-polybutadiene, or any styrenic block copolymer, such as styrene ethylene butadiene styrene, styrene-isoprene-styrene, etc., a metallocene or other single-site catalyzed polyolefin such as ethylene-octene, or ethylene-butene, or thermoplastic polyurethanes (TPU), including copolymers, with e.g. silicone.

Suitable peroxide initiating agents include dicumyl peroxide; 2,5-dimethyl-2,5-di(t-butylperoxy) hexane; 2,5-dimethyl-2,5-di(t-butylperoxy)hexyne; 2,5-dimethyl-2,5-di(benzoylperoxy)hexane; 2,2'-bis(t-butylperoxy)-di-isopropylbenzene; 1,1-bis(t-butylperoxy)-3,3,5-trimethyl cyclohexane; n-butyl 4,4-bis(t-butyl-peroxy)valerate; t-butyl perbenzoate; benzoyl peroxide; n-butyl 4,4'-bis(butylperoxy) valerate; di-t-butyl peroxide; or 2,5-di-(t-butylperoxy)-2,5-dimethyl hexane, lauryl peroxide, t-butyl hydroperoxide, c'-c' bis(t-butylperoxy)diisopropylbenzene, di(2-t-butyl-peroxy-isopropyl)benzene, di-t-amyl peroxide, di-t-butyl peroxide. Commercially-available peroxide initiating agents include DICUP™ family of dicumyl peroxides (including DICUP™ R, DICUP™ 40C and DICUP™ 40KE) available from Crompton (Geo Specialty Chemicals). Similar initiating agents are available from AkroChem, Lanxess, Flexsys/Harwick and R. T. Vanderbilt. Another commercially-available and preferred initiating agent is TRIGONOX™ 265-50B from Akzo Nobel, which is a mixture of 1,1-di(t-butylperoxy)-3,3,5-trimethylcyclohexane and di(2-t-butylperoxyisopropyl)benzene. TRIGONOX™ peroxides are generally sold on a carrier compound.

Suitable reactive co-agents include, but are not limited to, metal salts of diacrylates, dimethacrylates, and monomethacrylates suitable for use in this invention include those wherein the metal is zinc, magnesium, calcium, barium, tin, aluminum, lithium, sodium, potassium, iron, zirconium, and bismuth. Zinc diacrylate (ZDA) is preferred, but the present invention is not limited thereto. ZDA provides golf balls with a high initial velocity. The ZDA can be of various grades of purity. For the purposes of this invention, the lower the quantity of zinc stearate present in the ZDA the higher the ZDA purity. Suitable commercially available zinc diacrylates include those from Cray Valley.

Additional preferred co-agents that may be used alone or in combination with those mentioned above include, but are not limited to, trimethylolpropane trimethacrylate, trimethylolpropane triacrylate, and the like. It is understood by those skilled in the art, that in the case where these co-agents may be liquids at room temperature, it may be advantageous to disperse these compounds on a suitable carrier to promote ease of incorporation in the rubber mixture.

Antioxidants are compounds that inhibit or prevent the oxidative breakdown of elastomers, and/or inhibit or prevent reactions that are promoted by oxygen radicals. Some exemplary antioxidants that may be used in the present invention include, but are not limited to, quinoline type antioxidants, amine type antioxidants, and phenolic type antioxidants. A preferred antioxidant is 2,2'-methylene-bis-(4-methyl-6-t-butylphenol) available as VANOX® MBPC from R. T. Vanderbilt. Other polyphenolic antioxidants include VANOX® L (a reaction product of p-cresol and dicyclopentadiene), VANOX® SKT (3,5-di-tert-butyl-4-hydroxyhydrocinnamic acid triester of 1,3,5-(2-hydroxyethyl)-s-triazine-2,4,6(1H,3H,5H)trione), VANOX® SWP (4,4'-butylidenebis (6-tert-butyl-3-methylphenol)), VANOX® 13 (Polyalkylpolyphenolphosphite) and VANOX® 1290 (2,2'-ethylidenebis-(4,6-di-tert-butylphenol)).

Thermoset rubber compositions incorporated in golf balls of the present invention may also include an optional soft and fast agent. As used herein, "soft and fast agent" means any compound or a blend thereof that that is capable of making a core 1) be softer (lower compression) at constant CoR or 2) have a higher CoR at equal compression, or any combination thereof, when compared to a core equivalently prepared without a soft and fast agent. Suitable soft and fast agents include, but are not limited to, organosulfur or metal-containing organosulfur compounds, an organic sulfur compound, including mono, di, and polysulfides, a thiol, or mercapto compound, an inorganic sulfide compound, a Group VIA compound, or mixtures thereof. The soft and fast agent ingredient may also be a blend of an organosulfur compound and an inorganic sulfide compound. Examples include pentachlorobenzenethiol (PCTP) and salts thereof, including but not limited to Zn and ammonium.

As used herein when referring to the invention, the term "organosulfur compound(s)" refers to any compound containing carbon, hydrogen, and sulfur, where the sulfur is directly bonded to at least one carbon. As used herein, the term "sulfur compound" means a compound that is elemental sulfur, polymeric sulfur, or a combination thereof. It should be further understood that the term "elemental sulfur" refers to the ring structure of $S_8$ and that "polymeric sulfur" is a structure including at least one additional sulfur relative to elemental sulfur.

Fillers may also be added to the thermoset rubber composition of the core to adjust the density of the composition, up or down. Typically, fillers include materials such as tungsten, zinc oxide, barium sulfate, silica, calcium carbonate, zinc carbonate, metals, metal oxides and salts, regrind (e,g, recycled core material typically ground to about 30 mesh particle).

Fillers added to one or more portions of the golf ball typically include processing aids or compounds to affect rheological and mixing properties, density-modifying fillers, tear strength, or reinforcement fillers, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents which may be readily selected by one of ordinary skill in the art. Fillers may include polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

The polybutadiene and/or any other base rubber or elastomer system may also be foamed, or filled with hollow microspheres or with expandable microspheres which expand at a set temperature during the curing process to any low specific gravity level. Other ingredients such as sulfur accelerators, e.g., tetramethylthiuram di, tri, or tetrasulfide, and/or metal-containing organosulfur ingredients may also be used according to the invention. Suitable metal-containing organosulfur accelerators include, but are not limited to, cadmium, copper, lead, and tellurium analogs of diethyldithiocarbamate, diamyldithiocarbamate, and dimethyldithiocarbamate, or mixtures thereof. Other ingredients such as processing aids e.g., fatty acids and/or their metal salts, processing oils, dyes and pigments, as well as other additives known to one skilled in the art may also be used in the present invention in amounts sufficient to achieve the purpose for which they are typically used.

A core in a golf ball of the invention may be a solid single core. Alternatively, the core may be a multi-layered core comprising a center and at least one outer core layer. The center of the core may be solid, liquid-filled or hollow sphere. A core may be surrounded by one or more intermediate and/or cover layers. A core may even include a solid or liquid center around which tensioned elastomeric material is wound.

The core in a golf ball of the invention if a a single core may have a diameter of about 1.0 inch to about 1.64 inches, preferably about 1.30 inches to about 1.620, and more preferably about 1.40 inches to about 1.60 inches.

Cores for the golf balls of the present invention may alternatively have an outer core layer formed about a center, referred to as a "dual core" arrangement. In a multi-layer embodiment, the center has an outer diameter of about 0.25 inches to about 1.40 inches, or about 0.8 inches to about 1.30 inches, or about 1.00 inches to about 1.20 inches. The core may have an outer diameter of about 1.40 inches to about 1.64 inches, or about 1.50 inches to about 1.60 inches, or about 1.53 inches to about 1.58 inches.

An intermediate layer may be disposed about the core, with the cover layer formed around the intermediate layer. A golf ball of the invention have any overall diameter, but a generally preferred diameter is 1.68 inches—which meets the USGA (United States Golf Association) standard.

The cover may be formed of a single layer or multiple cover layers such as an inner cover layer and an outer cover layer. The cover may be formed from a castable polyurea or a castable polyurethane, i.e., meaning covers comprising castable polyurea (100% urea linkages/no urethane linkages); castable polyurethane (100% urethane linkages/no urea linkages); castable hybrid poly(urethane/urea) (the prepolymer is all urethane linkages and is cured with an amine); and castable hybrid poly(urea/urethane) (the prepolymer is all urea linkages and is cured with a polyol).

While the inventive golf ball may be formed from a variety of differing and conventional cover materials (both intermediate layer(s) and outer cover layer), preferred cover materials include, but are not limited to:

(1) Polyurethanes, such as those prepared from polyols or polyamines and diisocyanates or polyisocyanates and/or their prepolymers, and those disclosed in U.S. Pat. Nos. 5,334,673 and 6,506,851;
(2) Polyureas, such as those disclosed in U.S. Pat. Nos. 5,484,870 and 6,835,794; and
(3) Polyurethane-urea hybrids, blends or copolymers comprising urethane or urea segments.

Suitable polyurethane or polyurea compositions comprise a reaction product of at least one polyisocyanate and at least one curing agent. The curing agent can include, for example, one or more polyamines, one or more polyols, or a combination thereof. The polyisocyanate can be combined with one or more polyols or polyamines to form a prepolymer, which is then combined with the at least one curing agent. Suitable polyurethanes are described in U.S. Patent Application Publication No. 2005/0176523, which is incorporated by reference in its entirety.

Alternatively, other suitable polymers include partially or neutralized ionomer, metallocene, or other single-site catalyzed polymer, polyester, polyamide, non-ionomeric thermoplastic elastomer, copolyether-esters, copolyether-amides, polycarbonate, polybutadiene, polyisoprene, polystryrene block copolymers (such as styrene-butadiene-styrene), styrene-ethylene-propylene-styrene, styrene-ethylene-butylene-styrene, and the like, and blends thereof. Thermosetting polyurethanes or polyureas are suitable for the outer cover layers of the golf balls of the present invention.

Another cover material comprises a castable or reaction injection moldable polyurethane, polyurea, or copolymer or hybrid of polyurethane/polyurea. This cover is thermosetting but may be a thermoplastic, having a Shore D hardness of about 20 to about 70, more preferably about 30 to about 65 and most preferably about 35 to about 60. A moisture vapor barrier layer, such as disclosed in U.S. Pat. Nos. 6,632,147; 6,932,720; 7,004,854; and 7,182,702, all of which are incorporated by reference herein in their entirety, are optionally employed between the cover layer and the core.

Any of the embodiments herein may have any known dimple number and pattern such as 252 to 456 or 330 to 392, for example. The dimples may comprise any width, depth, and edge angle disclosed in the prior art and the patterns may comprises multitudes of dimples having different widths, depths and edge angles. The parting line configuration of said pattern may be either a straight line or a staggered wave parting line (SWPL).

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

While it is apparent that the illustrative embodiments of the invention disclosed herein fulfill the objective stated above, it is appreciated that numerous modifications and other embodiments may be devised by those skilled in the art. Therefore, it will be understood that the appended claims are intended to cover all such modifications and embodiments, which would come within the spirit and scope of the present invention.

What is claimed is:

1. A golf ball comprising a core and a cover disposed about the core;

wherein at least one of the core and the cover comprises a tri-blend composition of a non-E/X/Y type (TBC), formed from a blend of an ethylene acid (E/X) ionomer, a non-ionomeric softening copolymer (NISC) and a low viscosity component (LVC);

wherein a portion of the TBC comprising the ethylene acid (E/X) ionomer and the NISC has a Melt Flow Index $MF_1$ and a $CoR_1$ and the TBC has a Melt Flow Index $MF_2$ and a $CoR_2$ such that $MF_2 > MF_1$ and $CoR_1$ and $CoR_2$ differ by less than about 0.1; and wherein an E/X ionomer and NISC portion of the blend comprises the E/X ionomer in an amount of from about 30% to about 85% of the portion.

2. The golf ball of claim 1, wherein the E/X ionomer is formed from ethylene and an $\alpha,\beta$-ethylenically unsaturated carboxylic acid.

3. The golf ball of claim 2, wherein the α,β-ethylenically unsaturated carboxylic acid comprises at least one of acrylic acid and methacrylic acid.

4. The golf ball of claim 1, wherein the E/X ionomer and NISC portion of the blend comprises the E/X ionomer in an amount of from about 30% to about 75% of the portion.

5. The golf ball of claim 1, wherein the E/X ionomer and NISC portion of the blend comprises the E/X ionomer in an amount of from about 30% to about 60% of the portion.

6. The golf ball of claim 1, wherein the portion has a Melt Flow Index of less than about 3 g/10 mins.

7. The golf ball of claim 1, wherein the portion has a Melt Flow Index of less than about 2 g/10 mins.

8. The golf ball of claim 1, wherein the portion has a Melt Flow Index of less than about 1 g/10 mins.

9. The golf ball of claim 1, wherein the NISC comprises at least one of ethylene butyne, ethylene hexane and ethylene alkyl acrylate.

10. The golf ball of claim 1, wherein the LVC comprises at least one of a polyethylene homopolymer, a high-density oxidized polyethylene homopolymer, a polypropylene homopolymer, an ethylene-acrylic acid copolymer, oxidized ethylene-vinyl acetate copolymer, polyethylene copolymers, ethylene maleic anhydride copolymers, and propylene maleic anhydride copolymers.

11. The golf ball of claim 1, wherein the blend has a Melt Flow Index that is greater than the Melt Flow Index of the portion.

12. The golf ball of claim 11, wherein the blend has a Melt Flow Index that is greater than the Melt Flow Index of the portion by up to about 0.03 g/10 mins or greater.

13. The golf ball of claim 11, wherein the blend has a Melt Flow Index that is greater than the Melt Flow Index of the portion by at least about 0.11 g/10 mins.

14. The golf ball of claim 11, wherein the blend has a Melt Flow Index that is greater than the Melt Flow Index of the portion by about 0.66 g/10 mins or greater.

15. The golf ball of claim 11, wherein the blend has a Melt Flow Index that is greater than the Melt Flow Index of the portion by at least about 1.68 g/10 mins.

16. The golf ball of claim 1, wherein the blend has an Atti compression of from about −75 to about 200.

17. The golf ball of claim 1, wherein the TBC has a composition property relationship $\Delta CoR/\Delta MFI \leq \sim -10$, wherein $\Delta CoR$ is the amount by which $CoR_1$ and $CoR_2$ differ, and $\Delta MFI = (MFI_2 - MFI_1)$.

18. A golf ball comprising a core and a cover disposed about the core;
   wherein at least one of the core and the cover comprises a tri-blend composition of a non-E/X/Y type (TBC), formed from a blend of an ethylene acid (E/X) ionomer, a non-ionomeric softening copolymer (NISC) and a low viscosity component (LVC);
   wherein a portion of the TBC comprising the ethylene acid (E/X) ionomer and the NISC has a Melt Flow Index $MF_1$ and a $CoR_1$ and the TBC has a Melt Flow Index $MF_2$ and a $CoR_2$ such that $MF_2 > MF_1$ and $CoR_1$ and $CoR_2$ differ by less than about 0.1; and
   wherein the NISC is grafted.

19. The golf ball of claim 18, wherein the portion has a Melt Flow Index of less than about 3 g/10 mins.

20. The golf ball of claim 18, wherein the NISC comprises at least one of ethylene butyne, ethylene hexane and ethylene alkyl acrylate.

21. The golf ball of claim 18, wherein the LVC comprises at least one of a polyethylene homopolymer, a high-density oxidized polyethylene homopolymer, a polypropylene homopolymer, an ethylene-acrylic acid copolymer, oxidized ethylene-vinyl acetate copolymer, polyethylene copolymers, ethylene maleic anhydride copolymers, and propylene maleic anhydride copolymers.

22. A golf ball comprising a core and a cover disposed about the core;
   wherein at least one of the core and the cover comprises a tri-blend composition of a non-E/X/Y type (TBC), formed from a blend of an ethylene acid (E/X) ionomer, a non-ionomeric softening copolymer (NISC) and a low viscosity component (LVC);
   wherein a portion of the TBC comprising the ethylene acid (E/X) ionomer and the NISC has a Melt Flow Index $MF_1$ and a $CoR_1$ and the TBC has a Melt Flow Index $MF_2$ and a $CoR_2$ such that $MF_2 > MF_1$ and $CoR_1$ and $CoR_2$ differ by less than about 0.1; and
   wherein the blend comprises the LVC in an amount of from about 2% to about 40%.

23. The golf ball of claim 22, wherein the blend comprises the LVC in an amount of from about 5% to about 40%.

24. The golf ball of claim 22, wherein the blend comprises the LVC in an amount of from about 10% to about 40%.

25. The golf ball of claim 22, wherein the portion has a Melt Flow Index of less than about 3 g/10 mins.

26. The golf ball of claim 22, wherein the NISC comprises at least one of ethylene butyne, ethylene hexane and ethylene alkyl acrylate.

27. The golf ball of claim 22, wherein the LVC comprises at least one of a polyethylene homopolymer, a high-density oxidized polyethylene homopolymer, a polypropylene homopolymer, an ethylene-acrylic acid copolymer, oxidized ethylene-vinyl acetate copolymer, polyethylene copolymers, ethylene maleic anhydride copolymers, and propylene maleic anhydride copolymers.

28. A method of making a golf ball comprising:
   providing a core and forming a cover about the core;
   wherein at least one of the core and the cover comprises a tri-blend composition of the non-E/X/Y type (TBC) that is formed by blending an ethylene acid ionomer (E/X), a non-ionomeric softening copolymer (NISC) and a low viscosity component (LVC);
   wherein a portion of the TBC comprising the ethylene acid (E/X) ionomer and the NISC has a Melt Flow Index $MF_1$ and a $CoR_1$ and the TBC has a Melt Flow Index $MF_2$ and a $CoR_2$ such that $MF_2 > MF_1$ and $CoR_1$ and $CoR_2$ differ by less than about 0.1; and
   wherein the blend comprises the LVC in an amount of from about 2% to about 40%.

29. The method of making a golf ball of claim 28, wherein the blend comprises the NISC in an amount of from about 15% to about 70%.

30. A method of making a golf ball comprising:
   providing a core and forming a cover about the core;
   wherein at least one of the core and the cover comprises a tri-blend composition of the non-E/X/Y type (TBC) that is formed by blending an ethylene acid ionomer (E/X), a non-ionomeric softening copolymer (NISC) and a low viscosity component (LVC);
   wherein a portion of the TBC comprising the ethylene acid (E/X) ionomer and the NISC has a Melt Flow Index $MF_1$ and a $CoR_1$ and the TBC has a Melt Flow Index $MF_2$ and a $CoR_2$ such that $MF_2 > MF_1$ and $CoR_1$ and $CoR_2$ differ by less than about 0.1; and
   wherein a portion of the blend comprising the E/X ionomer and NISC comprises the E/X ionomer in an amount of from about 30% to about 85% of the portion.

31. The method of making a golf ball of claim 30, wherein the portion has a Melt Flow Index of less than about 3 g/10 mins.

32. The method of making a golf ball of claim 30, wherein the blend has a Melt Flow Index that is greater than the Melt Flow Index of the portion.

33. The method of making a golf ball of claim 30, wherein the blend comprises the NISC in an amount of from about 15% to about 70%.

34. A golf ball comprising a core and a cover disposed about the core;
   wherein at least one of the core and the cover comprises a tri-blend composition of the non-E/X/Y type (TBC) formed from a blend of an ethylene acid ionomer (E/X), a non-ionomeric softening copolymer (NISC) and a low viscosity component (LVC); and
   wherein the TBC comprises a phase-separated blend; and
   wherein the phase-separated blend comprises a continuous phase and a discontinuous phase wherein the average size of the discontinuous phase is less than about 10 microns.

35. The golf ball of claim 34, wherein the TBC has a composition property relationship CPR=(Atti compression)×(Melt Index) of from about −10,000 to about 10,000.

36. The golf ball of claim 34, wherein the ethylene acid (E/X) ionomer and NISC portions of the blend, combined, have a $CoR_1$ and the TBC has a $CoR_2$ such that $CoR_1 - CoR_2$ is less than about 0.1.

37. The golf ball of claim 34, wherein the average size of the discontinuous phase is less than about 5 microns.

38. The golf ball of claim 34, wherein the E/X ionomer is formed from ethylene and an $\alpha,\beta$-ethylenically unsaturated carboxylic acid.

39. The golf ball of claim 34, wherein the LVC comprises at least one of wherein the LVC comprises at least one of a polyethylene homopolymer, a high-density oxidized polyethylene homopolymer, a polypropylene homopolymer, an ethylene-acrylic acid copolymer, oxidized ethylene-vinyl acetate copolymer, polyethylene copolymers, ethylene maleic anhydride copolymers, and propylene maleic anhydride copolymers.

40. The golf ball of claim 34, wherein the NISC comprises at least one of ethylene butyne, ethylene hexane and ethylene alkyl acrylate.

* * * * *